Patented Oct. 7, 1952

2,612,726

UNITED STATES PATENT OFFICE 2,612,726

METHOD OF MAKING ULTRAVIOLET-TRANSMITTING HIGH-SILICA GLASSES

Martin E. Nordberg, Corning, N. Y., assignor to Corning Glass Works, Corning, N. Y., a corporation of New York No Drawing. Application April 21, 1950, Serial No. 157,403

8 Claims. (Cl. 49—79)

This invention relates to the treatment of glasses of the type disclosed in Patents No. 2,106,744 and 2,221,709, and particularly to a method of improving the properties and usefulness of such glasses for ultraviolet-emitting lamp envelopes.

According to such patents, an article composed of a glass containing over 94% $SiO_2$ can be produced by melting and shaping a particular easily meltable glass of lower silica content and extracting therefrom soluble, nonsiliceous constituents by leaching to leave a highly siliceous structure retaining its original shape and having a multiplicity of intercommunicating submicroscopic pores, which porous glass can be consolidated to a nonporous condition by heating.

On account of its high annealing point (on the order of 900° C.), such high-silica glass should be particularly adapted for the manufacture of tubes for use as envelopes for medium-pressure, mercury arc lamps; but such use is attended by difficulties in practice. The usual preliminary "baking out" of an envelope of such glass at the temperature (400° to 800° C.) customarily employed to eliminate gas from the interior of tubing to be utilized for such purpose is not entirely effective, with the result that a continuous, small but objectionable evolution of water vapor and other gas from the inner surface of such an envelope occurs during operation of a lamp made therefrom, whereby the useful life of the lamp is shortened. Moreover, any trace of iron remaining in the porous glass following leaching, is in part present in the ferric state after consolidation and causes an undesirable degree of absorption of ultraviolet radiations, an objectionable factor in lamps intended for ultraviolet emission.

In my copending application Serial No. 657,916, filed March 28, 1946, now Patent 2,505,001, I have described and claimed a method for treating tubes of such porous high-silica glass, during consolidation of the glass, to reduce the iron to the less absorptive ferrous state and to eliminate the water vapor and other dissolved gas from the glass. Such method comprises heating the porous glass tubes in an atmosphere of a hydrogen-containing reducing gas to reduce the iron, and thereafter heating the tubes to the consolidating temperature in a substantial vacuum for a time sufficient to consolidate the glass to a nonporous condition. As a result of such treatment the ultraviolet transmission of the glass is improved and its water and gas content is decreased to a negligible value, thereby increasing the efficiency and effective life of lamps made from such tubes.

In practicing such method, however, certain practical difficulties are encountered. For example, such porous glass tubes, when heated at a temperature sufficient to close the pores in the glass, tend to warp and flatten to an oval shape. When such tubes are so heated under atmospheric pressure, it is readily possible to rotate them about a longitudinal axis and thus avoid such warping and flattening. When such tubes are so heated in a vacuum in accordance with the method of my copending application, however, it is impossible to satisfactorily rotate them without the use of very special equipment which tends to render the operation prohibitive in cost. Consequently, tubes produced by such vacuum-firing method which are warped or out of round must subsequently be reheated under atmospheric pressure in a rotating furnace at extra expense, and even then they may not be satisfactory in contour.

I have already proposed, in application Serial No. 157,404, filed concurrently herewith, a method of treating such porous glass tubes under anhydrous conditions, while they are being heated to effect consolidation of the porous glass, to eliminate the difficulties and disadvantages of the vacuum-firing procedure. Such method comprises heating the porous glass tubes, at a temperature insufficient to effect substantial consolidation, in an atmosphere of a reducing gas to reduce the iron, and thereafter heating them, at a temperature insufficient to fuse the glass but sufficient to consolidate it to a nonporous condition, in an anhydrous atmosphere of a gas such as nitrogen, carbon dioxide, carbon monoxide, sulfur dioxide, helium, neon or argon, which is free of any water-forming constituent and which will not cause substantial oxidation of ferrous iron present in the glass at such temperature.

In order that the consolidated glass shall have the highest possible ultraviolet transmission, especially at the wave lengths of 302 and 254 millimicrons, it has heretofore been considered essential to use an atmosphere of a reducing gas, preferably hydrogen, in the treatment of the porous glass tubes thereby to reduce to the ferrous state the small amount of iron which may be present in the glass as an impurity. Inasmuch as hydrogen appears to react in some manner to produce water within the glass, however, it is necessary that the subsequent anhydrous atmosphere shall be free from hydrogen-containing constituents in order that the finished glass tubes may be substantially free from water.

It has now been found that such reduction of the ferric iron to ferrous iron can be accomplished by heating the porous glass tubes in an atmosphere of a gas free from hydrogen-containing constituents, for example, any of those recited above. It was not to be expected that nitrogen, carbon dioxide, helium, neon and argon could be employed in lieu of hydrogen for the present purpose. Nevertheless, they have been found unusually effective in the present process.

The present invention therefore, comprises heating the porous glass tubes in an anhydrous atmosphere of a gas free from hydrogen-containing constituents such as nitrogen, carbon dioxide, carbon monoxide, sulfur dioxide, helium, neon and argon to a temperature insufficient to effect substantial consolidation of the glass to cause substantial reduction of any ferric iron present in the glass, and then further heating the tubes in such atmosphere to a temperature insufficient to fuse the glass but sufficient to consolidate it to a nonporous condition until consolidation is complete. By such procedure not only is it possible to effect substantial reduction of the ferric iron in the glass and satisfactory removal of water and gas therefrom, but also conventional equipment can be used for consolidation of the porous glass tubes and warping and flattening of the tubes can thus be avoided.

In the practice of the present procedure, the porous glass tubes are advantageously subjected to an initial dehydration treatment for elimination of water loosely held within the pores. Such dehydration is effected by heating the tubes at a temperature ranging from about 600° to 900° C. Heating-up should be sufficiently slow to avoid rupture of the glass by too rapid drying.

The initially dehydrated porous glass tubes are then heated in the anhydrous atmosphere at a temperature ranging from about 950° to 1050° C. to reduce any ferric iron impurity and to substantially eliminate any residual water and gas from the glass before consolidation begins. Although the use of such anhydrous atmosphere can be begun at a temperature below 950° C., no particular advantage is derived thereby. Complete consolidation of the porous glass is effected in the presence of such anhydrous atmosphere by heating the glass to a temperature in the range between about 1150° and 1250° C.

In a preferred manner of carrying out the invention, tubes composed of the porous glass produced in accordance with the methods described in Patents No. 2,106,744 and 2,221,709 are initially slowly heated and held at 600° to 650° C. for 2 hours, or at higher temperatures up to 900° C. for correspondingly shorter times to remove most of the water from the glass. Such preliminary heating preferably is done in a preheating furnace.

The porous glass tubes are then transferred to a rotatable muffle furnace heated to 950° to 1050° C., and the air within the muffle is displaced by anhydrous carbon monoxide at substantially atmospheric pressure. The tubes are desirably maintained in this temperature range for ½ to 4 hours to insure reduction of any ferric iron present in the glass to ferrous iron and satisfactory removal of water and gas from the glass. The temperature thereafter is raised to 1200° to 1225° C. and is maintained there for at least 10 minutes to completely consolidate the porous glass to the nonporous condition. The furnace is then cooled. The flow of anhydrous carbon monoxide into the furnace is preferably continued until the temperature has cooled to about 1000° C. in order to prevent reoxidation of the ferrous oxide, and the gas is then shut off. The glass may then be removed from the furnace.

It is preferred to use carbon monoxide as the anhydrous atmosphere for the above-described treatment but nitrogen, carbon dioxide, or sulfur dioxide may be substituted therefor. The inert gases helium, neon or argon may also be used with good results but at an increase in cost.

If desired, the entire heat treatment can be carried out in a single furnace. Moreover, the temperature can be increased either gradually or stepwise.

Although the present method has been described in connection with the treatment of porous glass tubes, other articles of the same type of glass may also be advantageously treated by such method.

I claim:

1. The process of treating an article composed of a glass containing over 94% $SiO_2$ and having throughout its mass a multiplicity of submicroscopic intercommunicating pores, said glass containing a trace of ferric iron, which includes heating the article in an anhydrous atmosphere of a gas selected from the group consisting of nitrogen, carbon dioxide, carbon monoxide, sulfur dioxide, helium, neon and argon to a temperature sufficient to cause substantial reduction of the ferric iron present therein but insufficient to effect substantial consolidation of the glass and holding the article at such temperature for a time sufficient to effect such ferric iron reduction, and thereafter heating the article in said atmosphere to a higher temperature insufficient to fuse the glass but sufficient to consolidate it to a nonporous condition until consolidation is complete.

2. The process of treating an article composed of a glass containing over 94% $SiO_2$ and having throughout its mass a multiplicity of submicroscopic intercommunicating pores, said glass containing water and a trace of ferric iron which includes slowly heating the article to a temperature within the range 600° to 900° C. to dehydrate the glass without rupture, then heating it within the range 950° to 1050° C. in an anhydrous atmosphere of carbon monoxide and holding it within such range for a time sufficient to cause substantial reduction of any ferric iron present in the glass and to substantially eliminate any residual water from the glass, and thereafter heating it within the range 1150° to 1250° C. in such anhydrous atmosphere until the glass is consolidated to a nonporous condition.

3. The process of treating an article composed of a glass containing over 94% $SiO_2$ and having throughout its mass a multiplicity of submicroscopic intercommunicating pores, said glass containing water and a trace of ferric iron which includes slowly heating the article to a temperature within the range 600° to 900° C. to dehydrate the glass without rupture, then heating it within the range 950° to 1050° C. in an anhydrous atmosphere of carbon dioxide and holding it within such range for a time sufficient to cause substantial reduction of any ferric iron present in the glass and to substantially eliminate any residual water from the glass, and thereafter heating it within the range 1150° to 1250° C. in such anhydrous atmosphere until the glass is consolidated to a nonporous condition.

4. The process of treating an article composed of a glass containing over 94% $SiO_2$ and having throughout its mass a multiplicity of submicroscopic intercommunicating pores, said glass containing water and a trace of ferric iron which includes slowly heating the article to a temperature within the range 600° to 900° C. to dehydrate the glass without rupture, then heating it within the range 950° to 1050° C. in an anhydrous atmosphere of sulfur dioxide and holding it within such range for a time sufficient to cause substantial reduction of any ferric iron present in the glass and to substantially eliminate any residual water from the glass, and thereafter heating it within the range 1150° to 1250° C. in such anhydrous atmosphere until the glass is consolidated to a nonporous condition.

5. The process of treating an article composed of a glass containing over 94% $SiO_2$ and having throughout its mass a multiplicty of submicroscopic intercommunicating pores, said glass containing water and a trace of ferric iron which includes slowly heating the article to a temperature within the range 600° to 900° C. to dehydrate the glass without rupture, then heating it within the range 950° to 1050° C. in an anhydrous atmosphere of helium and holding it within such range for a time sufficient to cause substantial reduction of any ferric iron present in the glass and to substantially eliminate any residual water from the glass, and thereafter heating it within the range 1150° to 1250° C. in such anhydrous atmosphere until the glass is consolidated to a nonporous condition.

6. The process of treating an article composed of a glass containing over 94% $SiO_2$ and having throughout its mass a multiplicity of submicroscopic intercommunicating pores, said glass containing water and a trace of ferric iron, which includes slowly heating the article to a temperature within the range 600° to 900° C. to dehydrate the glass without rupture, then heating it within the range 950° to 1050° C. in an anhydrous atmosphere of a gas selected from the group consisting of nitrogen, carbon dioxide, carbon monoxide, sulfur dioxide, helium, neon and argon and holding it within such range for a time sufficient to cause substantial reduction of any ferric iron present in the glass and to substantially eliminate any residual water from the glass, and thereafter heating it within the range 1150° to 1250° C. in such anhydrous atmosphere until the glass is consolidated to a nonporous condition.

7. The process of treating an article composed of a glass containing over 94% $SiO_2$ and having throughout its mass a multiplicity of submicroscopic intercommunicating pores, said glass containing water and a trace of ferric iron, which includes slowly heating the article to a temperature within the range 600° to 900° C. to dehydrate the glass without rupture, then heating the article for ½ to 4 hours within the range 950° to 1050° C. in an anhydrous atmosphere of carbon monoxide to cause substantial reduction of any ferric iron present in the glass and to substantially eliminate any residual water from the glass, and thereafter heating it in said atmosphere for at least 10 minutes within the range 1200° to 1225° C. to consolidate the glass to a nonporous condition.

8. The process of treating an article composed of a glass containing over 94% $SiO_2$ and having throughout its mass a multiplicity of submicroscopic intercommunicating pores, said glass containing water and a trace of ferric iron which includes slowly heating the article to a temperature within the range 600° to 900° C. to dehydrate the glass without rupture, then heating it within the range 950° to 1050° C. in an anhydrous atmosphere of nitrogen and holding it within such range for a time sufficient to cause substantial reduction of any ferric iron present in the glass and to substantially eliminate any residual water from the glass, and thereafter heating it within the range 1150° to 1250° C. in such anhydrous atmosphere until the glass is consolidated to a nonporous condition.

MARTIN E. NORDBERG.

REFERENCES CITED

The following references are of record in the file of this patent:

UNITED STATES PATENTS

| Number | Name | Date |
| --- | --- | --- |
| 2,106,744 | Hood | Feb. 1, 1938 |
| 2,279,168 | Kalischer et al. | Apr. 7, 1942 |
| 2,303,756 | Nordberg et al. | Dec. 1, 1942 |
| 2,505,001 | Nordberg | Apr. 25, 1950 |